H. SCHUMACHER.
CONTROLLING DEVICE FOR PETCOCKS OF AUTOMOBILES.
APPLICATION FILED JULY 29, 1920.

1,381,670.

Patented June 14, 1921.
2 SHEETS—SHEET 1.

INVENTOR
Henry Schumacher
BY
ATTORNEY

H. SCHUMACHER.
CONTROLLING DEVICE FOR PETCOCKS OF AUTOMOBILES.
APPLICATION FILED JULY 29, 1920.

1,381,670.

Patented June 14, 1921.

UNITED STATES PATENT OFFICE.

HENRY SCHUMACHER, OF ALMA, MISSOURI.

CONTROLLING DEVICE FOR PETCOCKS OF AUTOMOBILES.

1,381,670.  Specification of Letters Patent.  Patented June 14, 1921.

Application filed July 29, 1920. Serial No. 399,756.

*To all whom it may concern:*

Be it known that I, HENRY SCHUMACHER, a citizen of the United States of America, and resident of Alma, in the county of Lafayette and State of Missouri, have invented certain new and useful Improvements in Controlling Devices for Petcocks of Automobiles, of which the following is a specification.

This invention relates to oil testing mechanism or devices for use on automobiles and particularly for use in connection with cars of the Ford type as they are now constructed, the said invention having for its object the provision of means to test the oil in the crank case which lubricates the engine, the said invention including a lock for controlling the oil discharge so that it will make it unnecessary for an operator to get down on the ground or use pliers to test for oil.

A still further object of this invention is to produce a device for controlling the cocks of crank cases of automobiles of the type indicated, the said invention also including means which will enable an occupant of the seat of an automobile to determine whether the cocks are closed or open. Often when traveling through weeds the cocks of the crank case are moved to an open position and the driver cannot tell whether such movement has taken place without stopping the automobile and getting out to explore under the automobile whereas the device of the invention makes it almost impossible for the cocks to open when driving through weeds and if they did open, the driver would be able to observe the change of location of the parts which are within his view and would know that the undesirable condition had arisen.

A still further object of this invention is to produce a tube applied to automobiles now in common use, and it is furthermore an object to produce a device of this character which will be easily installed and which will prove comparatively inexpensive to manufacture.

With the foregoing and other objects in view, the invention consists in the details of construction, and in the arrangement and combination of parts to be hereinafter more fully set forth and claimed.

In describing the invention in detail, reference will be had to the accompanying drawing forming part of this specification wherein like characters denote corresponding parts in the several views, and in which—

Figure 1:
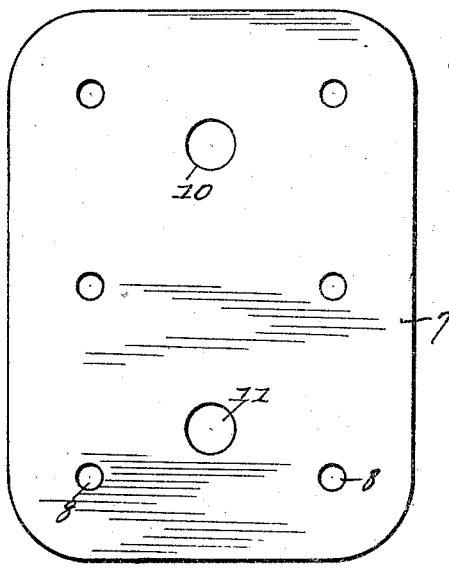
Figure 1 illustrates a view in elevation of one of the locking members.
Figure 2:
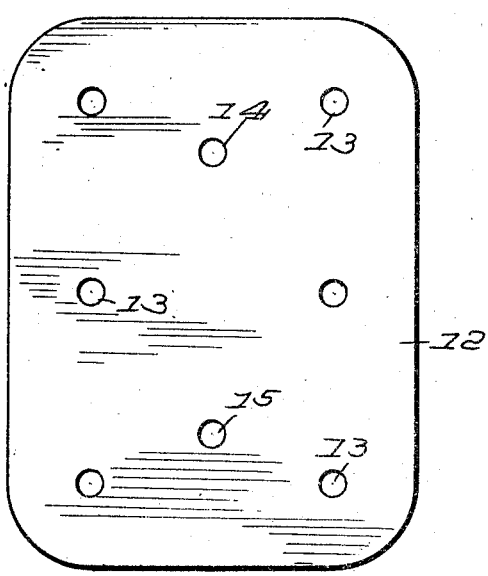
Fig. 2 illustrates a view in elevation of a pliable plate to be associated with the first mentioned plate.
Figures 3, 4:
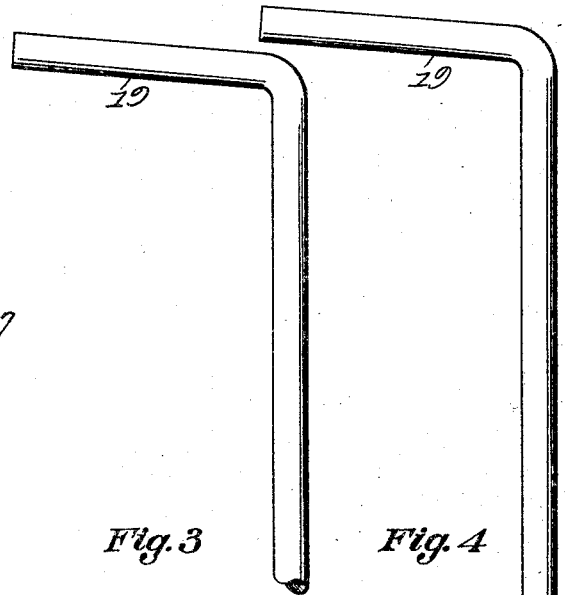
Figs. 3 and 4 illustrate views in elevation of the locking levers.
Figure 5:
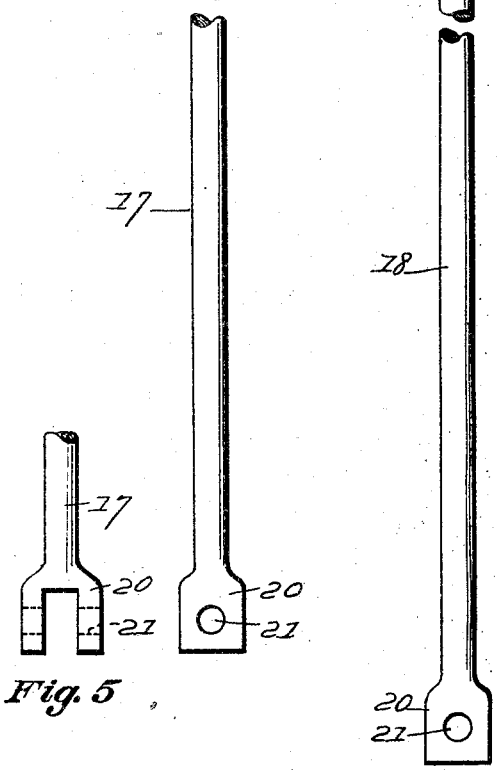
Fig. 5 illustrates a view of the lower end of one of the locking levers in a position at right angles to that shown in Fig. 3.

In these drawings 7 denotes a plate having a series of apertures 8 for the reception of fastenings such as bolts 9, and the said plate has relatively large apertures 10 and 11 for a purpose to be presently explained.

Associated with the plate 7 I employ a pliable member 12 having apertures 13 which are intended to aline with the apertures 8 and to receive the fastenings by which the member 12 and the plate are secured. The member 12 has apertures 14 and 15 which aline with the apertures 10 and 11 respectively, but they are smaller and the material around them is yieldable on account of the fact that the said member 12 is preferably made of leather or some such pliable material. The member 12 and the plate 7 are attached to the apron 16 of an automobile preferably several inches above the running board on the right hand side of the automobile. The member 12 is placed on the apron, and the plate 7 rests thereon, and the member 12 and the plate 7 are of course clamped to the apron by the fastenings as heretofore indicated.

The rods 17 and 18, one of which is preferably longer than the other, are of identical construction except as to length, and they preferably have angularly disposed ends 19 and are bifurcated at the opposite ends as at 20, the bifurcations preferably embracing the outer end of the plug of a pet-cock and being secured thereto by a fastening 21 such as a bolt.

The rods that are connected to the petcocks of the crank case extend to the outside of the apron. The apertures 10 and 11 are slightly larger than the diameter of the rods whereas the apertures 14 and 15 are slightly smaller than the diameter of the rods preferably about .32 of an inch smaller. This relation of parts causes the rods to distort the material of the member 12 and press it into the apertures 10 and 11 between the rods and the edges of the apertures to form a tight joint, an arrangement which prevents motion of the rods with relation to the plates, due to the friction caused by the distorted flexible material, and the rods are thus held out of engagement with each other and will prevent the passage of mud to the outside of the apron.

Figure 6:
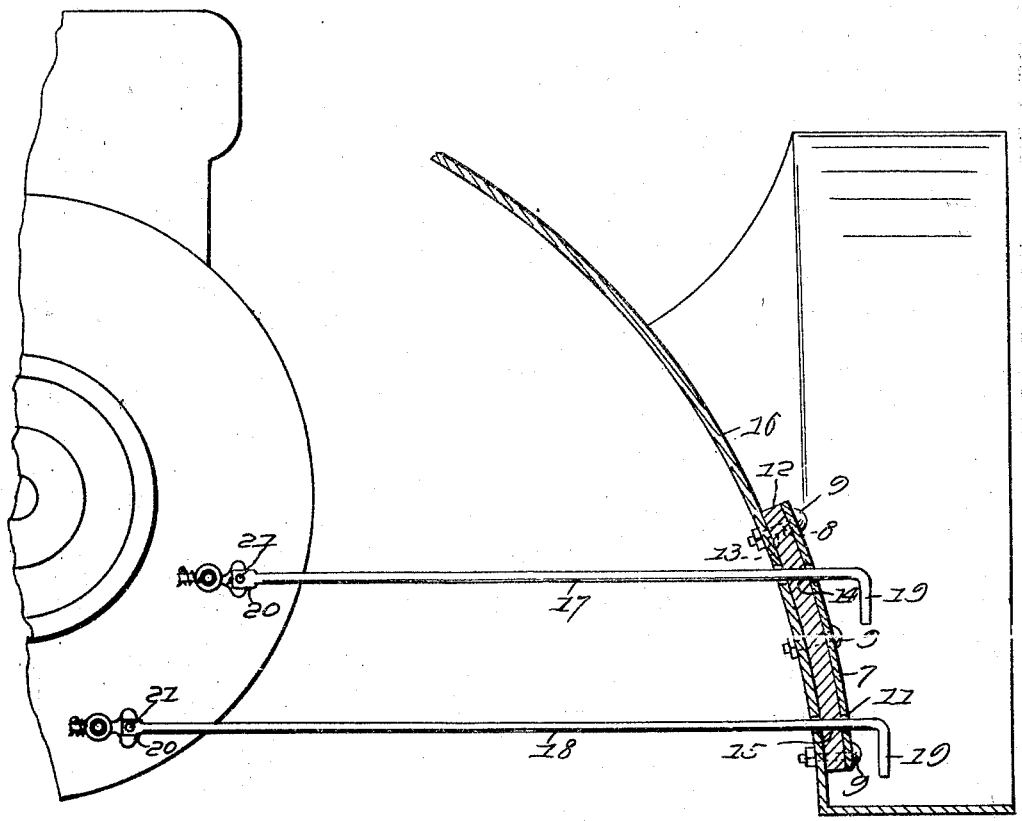
Fig. 6 illustrates a view in elevation of an automobile showing the relation of the cock operating members to the locking elements.

The construction and arrangement of parts as shown in Fig. 6, and the details of construction of the elements are well shown in the other figures of the drawing, and the dvantages and construction will, it is thought, be apparent to one skilled in the art.

I claim:

In a controlling device for pet-cocks of automobiles, rods connected to said pet-cocks, said rods having position indicators thereon, a flexible member anchored to an automobile, said flexible member having apertures through which the rods extend, said openings being normally smaller than the rods, a plate superimposed on the flexible member and secured therewith, the said plate having apertures coinciding with the apertures of the flexible member to receive the rods. the said apertures of the plates being larger than the apertures of the said flexible member.

HENRY SCHUMACHER.